Patented Apr. 14, 1931

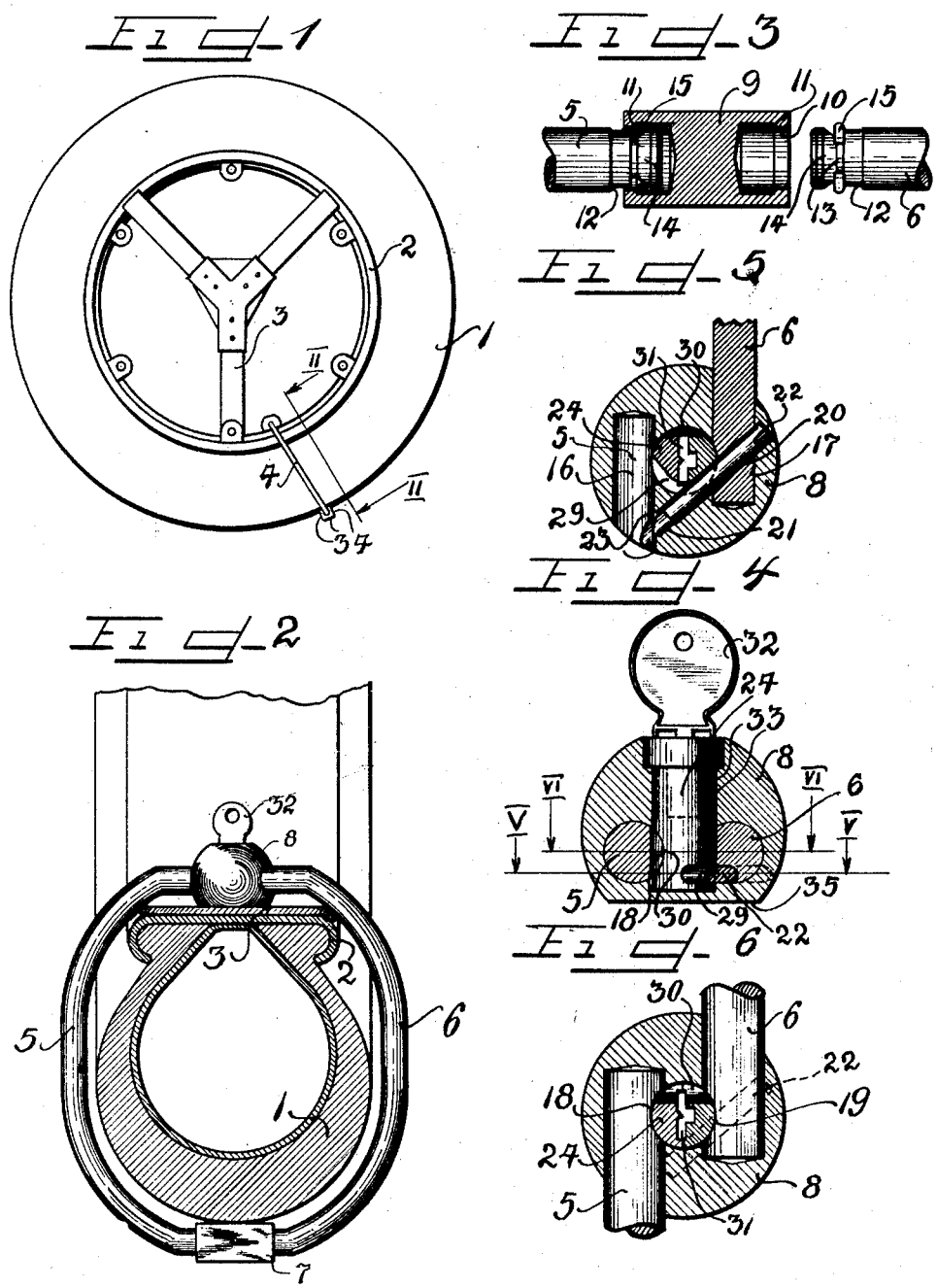

1,800,943

UNITED STATES PATENT OFFICE

JOHN JUNKUNC, OF CHICAGO, ILLINOIS

SPARE-TIRE LOCK

Application filed July 25, 1927. Serial No. 208,099.

This invention relates to improvements in locking devices for any and all of their uses and purposes, and more particularly to a lock having a relatively large hasp or encircling portion, which is especially adaptable for securing spare tires and the like to vehicles.

Locking devices for spare tires heretofore known have proven objectionable in various ways. In the manufacture of chain locks it is very difficult to strike a happy medium in the relative hardness in a link, and these locks are very costly to construct in a desirable manner. The common hasp locks are also relatively expensive and are not as easily and readily manipulated as is desirable.

This invention is designed to overcome the above-mentioned objections by the provision of a substantially safe, inexpensive and easily manipulated lock for various uses but which is especially adapted to be used with a spare vehicle tire to substantially prevent the unauthorized removal of the same.

Another object of this invention is to provide a lock of the class described which is easily and simply adjusted to prevent rattling of the same when mounted on a moving vehicle.

A further object of this invention is to provide a lock having a flexible joint in its hasp or encircling portion.

Other and further important objects and advantages of this invention will be apparent from the disclosures in the specification and accompanying drawings.

This invention (in a preferred form) is illustrated in the drawings and hereinafter more fully described.

In the drawings

Figure 1 is a view in elevation showing a locking device embodying features of this invention in operative position on a spare tire and rim.

Figure 2 is an enlarged sectional view of the tire and rim, with the locking device shown in elevation, said view being taken substantially along line II—II of Figure 1.

Figure 3 is a sectional and diagrammatic view of the flexible joint of the arms of the device.

Figure 4 is an enlarged vertical sectional view, with parts in elevation, taken through the lock cylinder.

Figure 5 is a plan sectional view, with parts in elevation and the key barrel turned substantially 90°, taken substantially along line V—V of Figure 4.

Figure 6 is a plan sectional view, with parts in elevation and the key barrel turned substantially 90°, taken substantially along line VI—VI of Figure 4.

As shown on the drawings

In the illustrated embodiment of this invention there is shown a tire 1 with the usual rim 2 thereon, mounted on the usual spare tire carrier 3, and locked thereto with a locking device, indicated generally by the reference numeral 4, embodying principles of the present invention. Obviously, this locking device 4 may be used in various other positions and places, including those disclosed in my copending application for spare tire lock, Serial No. 163,889, filed January 27, 1927.

The locking device or lock 4 comprises, in this instance, a pair of arcuate members or arms 5 and 6, respectively, adapted to encircle the tire, rim and support, as shown clearly in Figure 2, or other articles to be locked. These arms 5 and 6 are preferably formed of steel, the outer shell of which is case-hardened to a thickness sufficient to effectively prevent cutting of the same, thereby leaving a relatively soft inner core to effectively prevent the breaking of the arms by heavy blows or the like. Each extremity of the arms 5 and 6 is bent so as to project inwardly substantially horizontally and parallel to each other, to more adequately and properly embrace a spare tire and carrier or similar article. Adjacent ends of the arms 5 and 6 are united or secured by a flexible joint generally indicated by the reference numeral 7. When the device is in operative position or locked the other ends of the arms 5 and 6 are rigidly secured within the lock cylinder 8 by means later to be described herein.

The flexible joint or hinge 7 comprises a block 9 recessed at each end thereof as shown at 10, which recess is enlarged in its inner part to provide an annular shoulder 11. The ends of the arms 5 and 6 are shouldered as at 12 and grooved as at 13 to provide an extended conical end or tip 14 thereon. These conical tips, as clearly shown in Figure 3, converge outwardly towards the major portion of the arms. A split or spring ring 15 having spaced ends is sprung on each of the arms 5 and 6 in the grooves 13. The end of the arm 5 or 6 is then inserted in the recess 10, the ring being pressed therein, after which the ring will expand and be retained within the recess by the annular shoulder 11. It is to be noted, as clearly shown to the left of Figure 3, that when an outward pull is exerted upon an arm the ring 15 is pressed against the shoulder 11 by the conical portion 14 so that substantially half the thickness of the ring will extend inwardly beyond the shoulder 11. It is apparent, therefore, that to disengage an arm 5 or 6 from the block 9, it is necessary to shear the ring throughout its entire length, thereby rendering is impossible for all practical purposes to disrupt the joint 7. The conical ends 14 are, of course, loosely engaged within the recess 10 so that the arms 5 and 6 may rotate with respect to each other and the block 9 and may move a considerable distance towards and away from each other. Thus the arms are adapted to be quickly and easily placed in their desired locking position.

The lock cylinder 8 is provided with spaced parallel recesses 16 and 17 therein to accommodate the other ends of the arms 5 and 6, respectively. The arms 5 and 6 are notched as at 18 and 19 (Figure 6) and the arms 6 is further provided with a substantially spiral groove 20. A groove 21 passes obliquely from the recess 16 through the other recess 17 within the lock cylinder to accommodate a hardened pin 22 which pin is also engaged within the groove 20 to thereby permanently secure the lock cylinder 8 to the end of the arm 6. After the pin has been positioned the outer edges of the groove 21 are distorted as at 23 to prevent the removal of the pin. This hardened pin 22 also serves to retain a key barrel 24 within the lock cylinder 8 by engaging in a substantially semicircular groove 29 adjacent the inner extremity of the key barrel. The hardened pin 22 also effectively prevents, for all practical purposes, the sawing through of the lock cylinder 8 in any locality whereby the locking mechanism may be released. The key barrel 24 is adapted to rotate substantially 90° within the cylinder 8, which rotation is limited by the pin 22. The key barrel is also notched as at 30 complementary to the arms 5 and 6, said notch 30 being on the same plane as the notch 18 and 19 in the arms. The key barrel, of course, is provided with an opening 31 therethrough to accommodate a suitable key 32 and with tumblers 33 to permit the actuation of the key barrel only by a key of specified and predetermined design. As shown in Figure 4, the arm 5 may be readily removed from the cylinder 8 but, as shown in Figure 6, when the key barrel is turned substantially 90° the notch 30 is disposed transversely to the arms 5 and 6 whereby the body of the key barrel is engaged within the notch 18 in the arm 5 for effectively preventing removal of this arm.

It is to be noted that the block 9 is of polygonal cross-section and has a plurality of flattened faces 34 thereon (Figure 1), and that the lock cylinder 8 has a substantially flattened face 35 on its inner surface, for a purpose hereinafter to be described.

To operate the present invention, assuming the same to be in locked position as shown in Figure 1, it is merely necessary to insert the key 32 in the key barrel 34 and rotate the same approximately 90°. The arm 4 may then be extracted from the cylinder 8 by a pull outwardly away from the carrier 3 and rotated downwardly sufficiently to permit the removal of the device, the key remaining within the key barrel while the device is unlocked. To secure the device around a tire or other article, the above operation is reversed and the key removed. It is to be noted, however, that when the device is locked in position the flattened face 35 of the cylinder 8 is positioned on the inner surface of the tire carrier rim 3, or the tire rim as the case may be, depending upon the type of carrier used, and the block 9 abuts the tread of the tire 1. With the cylinder firmly held against the rim of the carrier 3, the arms 5 and 6 are forced sideways, the block 9 rotating upon the tire 1. After the arms have been forced in this manner a sufficient distance, a clamping action results and one of the flattened faces will be in abutment with the tire 1 and the relatively sharp edges between the faces 34 press into the tire and effectively prevent the locking device from shifting its position. Obviously, when the vehicle to which the device is so secured is in motion, the device will not tend to become loosened and rattle with the jarring of the vehicle. It is to be noted also that the locking device hereinabove described will function equally as well if secured in a position inverted relative to that disclosed in the drawings, and such positioning of the device, of course, will not depart from the spirit of this invention.

From the foregoing it will be apparent that I have provided a lock suitable for various purposes and especially for the securement of a spare tire to a vehicle, which lock is very easily and readily manipulated, is substantially safe against the unauthorized removal thereof, and may be inexpensively manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a locking device, a pair of arms, each of said arms being grooved adjacent one end thereof to form a conical tip, a block having recesses therein to admit said tips, resilient means on the said conical tips for retaining said conical tips within said recesses for rotation therein independently of each other, and locking means to engage the other ends of said arms.

2. In a device for locking a spare tire to a support therefor, means to transversely encircle said tire and support, a lock cylinder for maintaining said means locked around said tire and rim, the said means including a rotatable member adapted to tightly press into said tire when said means are moved relatively to said tire.

3. In a locking device, a pair of substantially arcuate members adapted to encircle a tire carrier and a tire thereon to be locked, means having a plurality of flattened surfaces thereon for rotatably receiving certain ends of said members, a lock cylinder associated with other ends of said members, said cylinder having a surface thereon for cooperation with a surface of the said tire carrier, so that when said device is locked said means may be moved relatively to said tire carrier and tire until one of said flattened surfaces engages the tread of the tire to stress said arcuate members, and thereby tighten the device in its operative position.

4. In a locking device, means forming a hasp having a pair of end portions, one of said portions having a spiral groove and a notch therein, the other of said portions also being notched, a lock cylinder recessed to accommodate the notched portion and grooved to accommodate a pin, a pin engaged in said groove to secure said cylinder to said grooved and notched portion, and a key barrel rotatable within said cylinder, said key barrel being grooved adjacent said pin and provided with a notch to engage the notch in the end of the other of said portions to retain the same within said cylinder.

5. A spare tire lock including a lock cylinder having a flat face, a pair of substantially semi-circular arms, an end of one of said arms being permanently and pivotally engaged in said cylinder, the corresponding end of the other of said arms being removably lockable in said cylinder, and a block polygonal in cross-section flexibly connecting the other ends of said arms, said block being disposed opposite to the flat face of said cylinder.

6. A locking device including a lock cylinder having a flat face, a pair of arms each having an end arranged to be received in and secured in the said cylinder, and a block polygonal in cross-section flexibly connecting the other ends of the said arms and revolvably mounted thereon, the said block being in spaced opposed relation to the said cylinder when the arms are in secured position in the cylinder.

7. A locking device for a tire-carrier and the spare tire thereon, the said device including a lock cylinder, a pair of arms each having an end arranged to be received in and secured in the said cylinder, means connecting the other ends of the said arms, and a member revolvably mounted on the said arms in spaced opposed operative position relative to the said cylinder, the said cylinder and the said revolvable member having surfaces arranged to frictionally engage surfaces of a tire-carrier and a tire whereby the arms may be moved relative to the tire to stress the device in operative position.

In testimony whereof I have hereunto subscribed my name at Chicago, Cook County, Illinois.

JOHN JUNKUNC.